(12) United States Patent
Katz

(10) Patent No.: US 7,849,758 B2
(45) Date of Patent: Dec. 14, 2010

(54) TOOTHED MEMBER AND A GEARSEAT RELATING THERETO

(76) Inventor: Andre Katz, 33 rue Boussingault, Paris (FR) F-75013

(*) Notice: Subject to any disclaimer, the term of this patent is extended or adjusted under 35 U.S.C. 154(b) by 536 days.

(21) Appl. No.: 10/592,528

(22) PCT Filed: Mar. 11, 2005

(86) PCT No.: PCT/FR2005/000600

§ 371 (c)(1),
(2), (4) Date: Sep. 12, 2006

(87) PCT Pub. No.: WO2005/098279

PCT Pub. Date: Oct. 20, 2005

(65) Prior Publication Data

US 2007/0207051 A1 Sep. 6, 2007

(30) Foreign Application Priority Data

Mar. 12, 2004 (FR) ................................. 04 02614

(51) Int. Cl.
*F16H 55/00* (2006.01)

(52) U.S. Cl. .......................................... 74/462; 74/443
(58) Field of Classification Search .................... 74/462, 74/457, 443; 418/206.5
See application file for complete search history.

(56) References Cited

U.S. PATENT DOCUMENTS

| | | | | |
|---|---|---|---|---|
| 3,220,279 A | * | 11/1965 | Dareing | ........................ 74/462 |
| 3,251,236 A | | 5/1966 | Wildhaber | |
| 4,276,785 A | * | 7/1981 | Rouverol | ..................... 74/462 |
| 4,644,814 A | * | 2/1987 | Rouverol | ..................... 74/462 |
| 5,271,289 A | | 12/1993 | Baxter, Jr. | |
| 6,178,840 B1 | * | 1/2001 | Colbourne et al. | ............ 74/462 |

* cited by examiner

*Primary Examiner*—Richard W Ridley
*Assistant Examiner*—Alan B Waits
(74) *Attorney, Agent, or Firm*—Young & Thompson

(57) ABSTRACT

The action curve (A), that is, the locus of the gearing contact points throughout the gearing process, is a lemniscate (Lg, Ld) having a double point coinciding with the rolling point (T) of two pitch circles ($P_{rg}$, $P_{rd}$). The gearing contact begins at one of the apexes ($S'_{gh}$) of the lemniscate under a zero Hertzian pressure between two profile points where the profiles have the same curvature centered at the rolling point (T). Wear and operating noise are reduced.

16 Claims, 12 Drawing Sheets

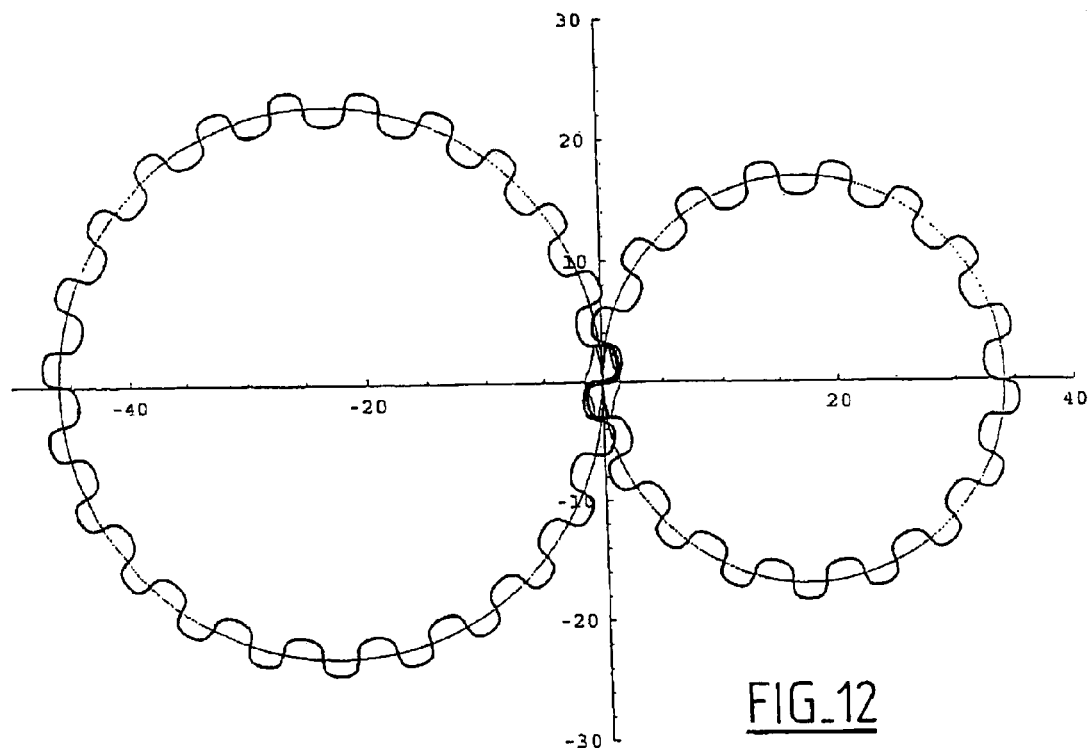
FIG_12
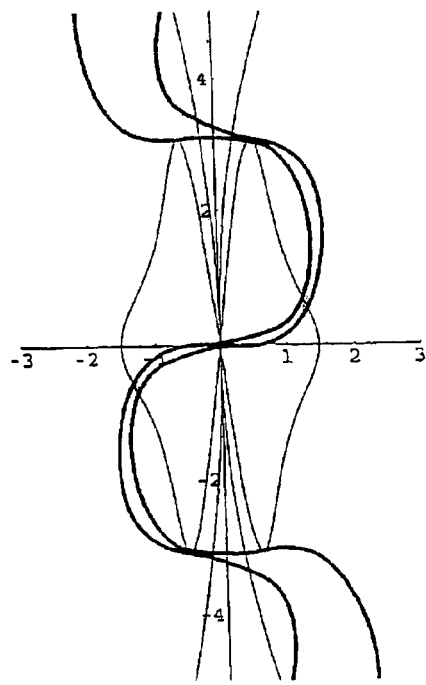
FIG_13
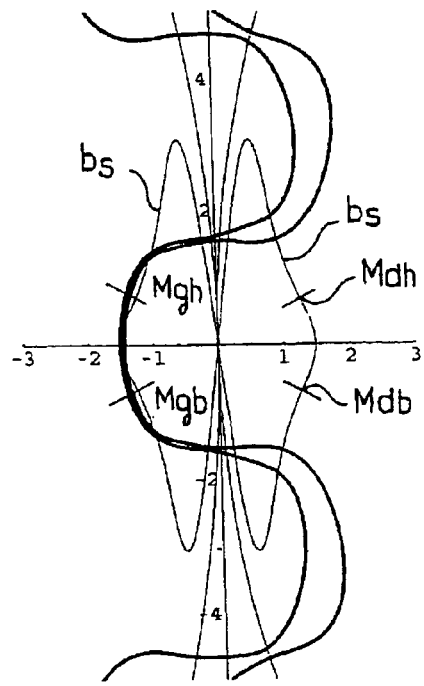
FIG_14

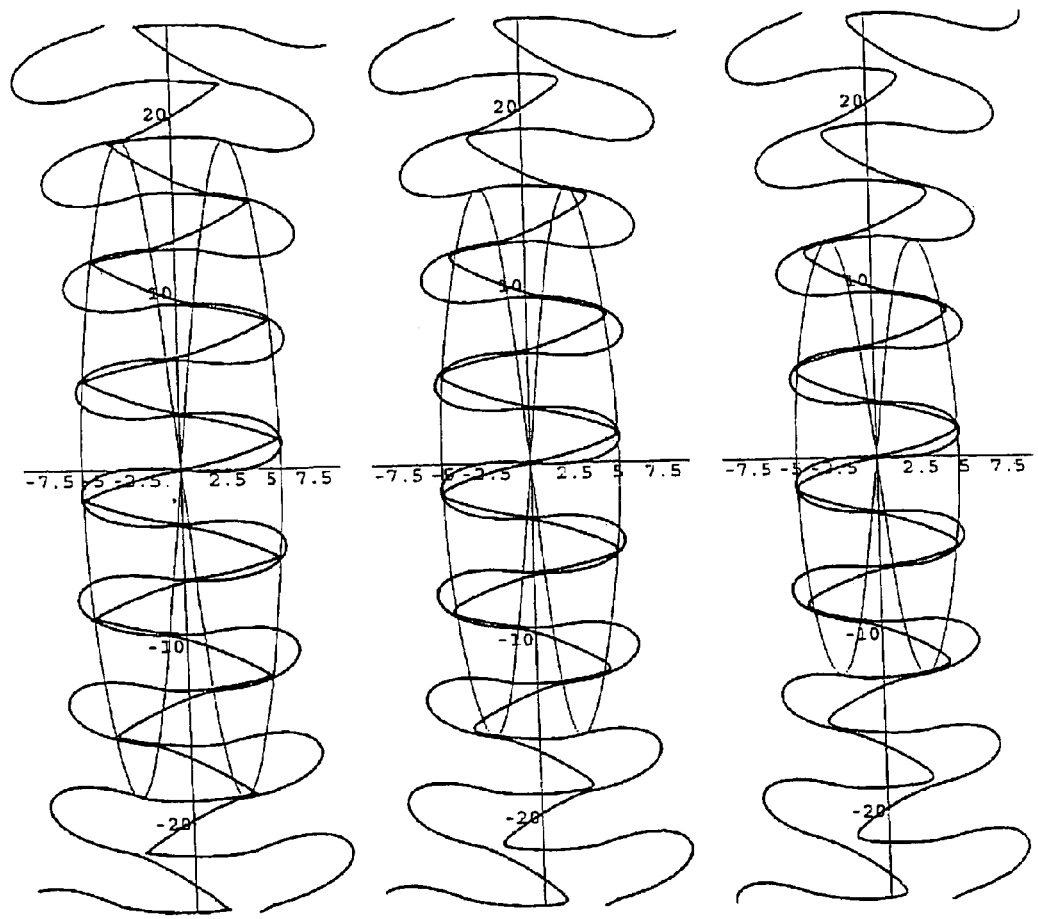
FIG_18  FIG_19  FIG_20
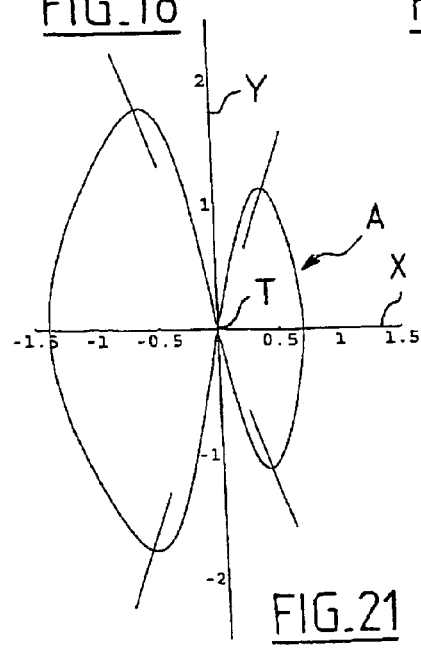
FIG_21
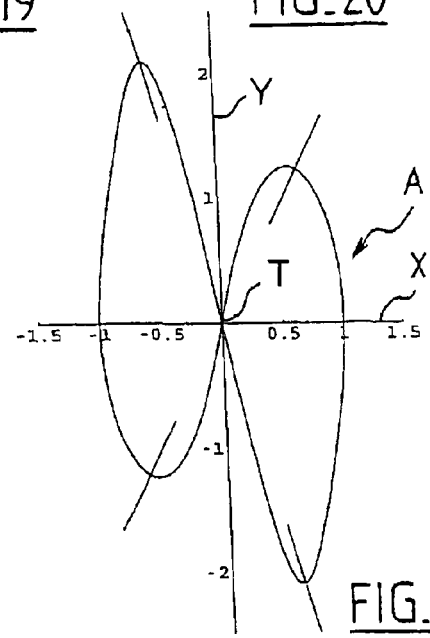
FIG_22

TOOTHED MEMBER AND A GEARSEAT RELATING THERETO

This invention relates to a toothed component designed to mesh with a compatible toothed component.

This invention also relates to a gear in which two toothed components of this type are meshed.

Despite the industrial importance of gears, their geometry has been the focus of only a very small number of theoretical works, and has hardly evolved since the end of the 19th century. Power transmission (by contrast to the movement of clocks) universally uses involute profiles.

In a homokinetic transmission, the movement is transmitted from one toothed wheel to the other as if two theoretical circles, known as "pitch circles", each of which is fixed to and concentric with one of the two toothed wheels, were rolling over one another at a pitch point consequently situated on the straight line passing through the two centers of the pitch circles, in other words through the two axes of the wheels.

The locus of the points of contact between the teeth of the two wheels during meshing, relative to the line of centers which is presumed to be fixed, is called the "action curve". In involute gears, the action curve is constituted by two rectilinear segments that intersect at the pitch point and are inclined to the line of centers. These two segments lie on two straight lines each of which is tangent to two base circles, each concentric to one of the pitch circles. It is known that the segments along which the contact points move must be short enough not to reach the points of tangency with the base circles, because at these points of tangency the contact pressure would have an infinite value. For this reason, the teeth are shortened and typically have a flat apex.

When an involute gear tooth makes meshing contact, the contact pressure suddenly switches from a value of zero to its maximum value. This results in a shock and the repetition of these shocks produces the characteristic noise of straight-cut gears.

This noise can be reduced by helical cutting of the toothed wheels, which results in the gearing relationship beginning point-by-point and no longer simultaneously along a whole line along the axial dimension of the tooth. This however results in undesirable axial thrust.

Moreover, involute gears must have at least a minimum number of teeth on each wheel, generally approximately a dozen. Below this value, the power transmission contact between the wheel with a small number of teeth and the other toothed component (wheel or rack) is not continuous, or interference problems occur between the two profiles.

U.S. Pat. No. 3,251,236 teaches the finding of meshing profiles in which the two points of establishment of mutual contact, which each belong to one of the two profiles, at the time of making contact both have a center of curvature that coincides with the pitch point of the pitch circles. However, the description of these profiles is essentially pictorial. The document proposes starting from a basic profile, typically a rack profile, having a point at which the center of curvature is situated on the pitch curve, and producing the toothed wheels by generation from this basic profile.

U.S. Pat. No. 5,271,289 describes gear teeth with entirely convex active surfaces.

The object of this invention is to define a new geometry that overcomes the above-mentioned drawbacks and limitations of involute gears, and allows great freedom of choice and optimization of the meshing profile and the meshing process.

According to the invention, the toothed component, which is rotatable about an axis and comprises teeth that in each plane perpendicular to the axis are bounded by a meshing profile that during meshing comes into contact with a mating profile of a compatible toothed component, at contact points that move along a locus called an action curve, while the meshing profile and the mating profile respectively have the same rotation speed as two ideal pitch circles each attached to one respectively of the meshing profile and the mating profile, these two pitch circles rolling on one another, without sliding, at a pitch point that is fixed relative to the action curve, is characterized in that the action curve has at least one apex where the distance between the action curve and the pitch point has a maximum value, in that at least one point of the meshing profile has a radius of curvature equal to said maximum value, in that said one point of the meshing profile passes through said apex of the action curve in an orientation in which, at said one point of the meshing profile, the center of curvature of the meshing profile coincides with the pitch point, and in that in a coordinate system the x-axis of which is the line of the centers of rotation of the pitch curves, and the y-axis of which is the tangent common to the pitch curves at the pitch point, the Cartesian coordinates of a curve defining at least a part of the meshing profile are:

$$x(t) = p\left(\cos\left(\frac{\psi(t)}{p}\right) - 1\right) + \rho(t)\sin\left(\delta(t) + \frac{\psi(t)}{p}\right)$$

$$y(t) = p\sin\left(\frac{\psi(t)}{p}\right) - \rho(t)\cos\left(\delta(t) + \frac{\psi(t)}{p}\right)$$

in which expressions:

p is a positive or negative integer, −p is the abscissa of the center of rotation and |p| is the number of teeth, δ(t), ρ(t) are the polar coordinates of the point (t) of the action curve in a system centered at the pitch point, the polar axis of which is tangent to the pitch circle, the polar angle of which is in the interval [0, π] and the radius vector is positive on one lobe and negative on the other, $$\psi(t) = \int_{t_0}^{t} \frac{\rho'(\tau) d\tau}{\cos(\delta(\tau))}$$

$t_0$ is an arbitrary number the variation of which corresponds to a rotation of the toothed component about its pivot.

The invention is based on a reflection that relates on the one hand to the univalent link between the action curve and the meshing profile of the toothed component and on the other hand to the choice of an action curve having the effect of eliminating the drawbacks of involute gears.

The points of the action curve that are situated at maximum distances from the pitch point correspond to the establishment of meshing contact or to loss of meshing contact depending on the direction of rotation of the toothed components.

According to the invention, these apexes of the action curve, instead of being ends of straight segments as in involute gears, have a normal passing through the pitch point. Moreover, points of the meshing profile that pass through an apex of the action curve have a curvature that, when this point coincides with the apex of the action curve, is centered on the pitch point.

Two compatible toothed components that are able to mesh with one another have meshing profiles qualified as mating profiles, i.e. having sliding contacts between them when the pitch curves are turned about their respective centers. One of the conditions for the mating of the profiles is that their action curves coincide when these toothed components are in their state of mutual meshing.

Then, when the toothed component according to the invention meshes with a compatible toothed component, and a relative position is obtained where there is contact at the apex of the action curve, both the profiles have at this contact point identical curvatures centered on the pitch point. Such contact is known as "osculating". It is known that when the curvatures are equal, the contact pressure vanishes, up to the Hertzian approximation. As this situation corresponds to the establishment of contact in one of the directions of rotation, according to the invention a toothed component is produced that is capable of meshing without shocks, and is consequently quiet.

If the action curve extends on either side of the apex, the meshing profile, having reached the apex of the action curve in the direction of the establishment of contact with the mating profile, will then, while moving towards the pitch point after having passed the apex of the action curve, no longer intersect the action curve at a single point, but at two. This means that the single osculating contact point at the time of the establishment of contact, immediately splits into two distinct contact points.

An appropriate action curve according to the invention can typically be all or part of a lemniscate having a double point that coincides with the pitch point, and two lobes that intersect the line of the centers of rotation of the pitch curves on either side of the double point.

The word "lemniscate" is used here in the very general sense of a curve globally having the shape of the symbol ∞, without this term "lemniscate" being limited to a more precise mathematical definition.

By contrast, it is within the scope of this invention to choose the lemniscate according to desired characteristics for the profile of the teeth, and for their meshing mode, as will be explained later with various examples.

If the lemniscate is complete, the contact points sweep the entire toothing profile, both the bottom of the tooth space as well as the apex of the teeth. This is completely original compared with involute teeth.

It is also possible, however, to cut away certain parts of the meshing profile in order to eliminate certain parts of the action curve. This can in particular be advantageous in order to eliminate contact in regions where the value of the pressure angle is too high.

Although lemniscates are very preferred action curves, they do not constitute the only option. In particular all of the meshing profiles parallel to a meshing profile according to the invention are meshing profiles according to the invention. If a meshing profile according to the invention, obtained for example by parallelism as stated above, is situated completely outside or completely inside the pitch curve, the action curve no longer passes through the pitch point and becomes a single closed curve, without a double point.

With the formulae according to the invention, the choice of an appropriate action curve allows for direct determination of the corresponding toothing profiles.

Another aspect of this invention, relates to a gear comprising two inter-meshed toothed components, each according to the first aspect and having action curves that coincide.

The invention also relates to a gear comprising two toothed components according to the first aspect, characterized in that the establishment of contact between two teeth takes place at the apex of the action curve, by an osculation of the two profiles, followed by a splitting of the osculating contact into two simple contacts.

Other features and advantages of the invention will also become apparent from the description below, relating to non-limitative examples.

In the attached drawings:

FIGS. 12 to 14 are three views similar to FIGS. 1 to 3, but for the embodiment according to FIG. 8;

FIGS. 18, 19, 20 show three embodiments of the meshing zone of toothed wheels with numerous teeth;

FIGS. 21 and 22 show two examples of asymmetric action curves;

Figure 1:
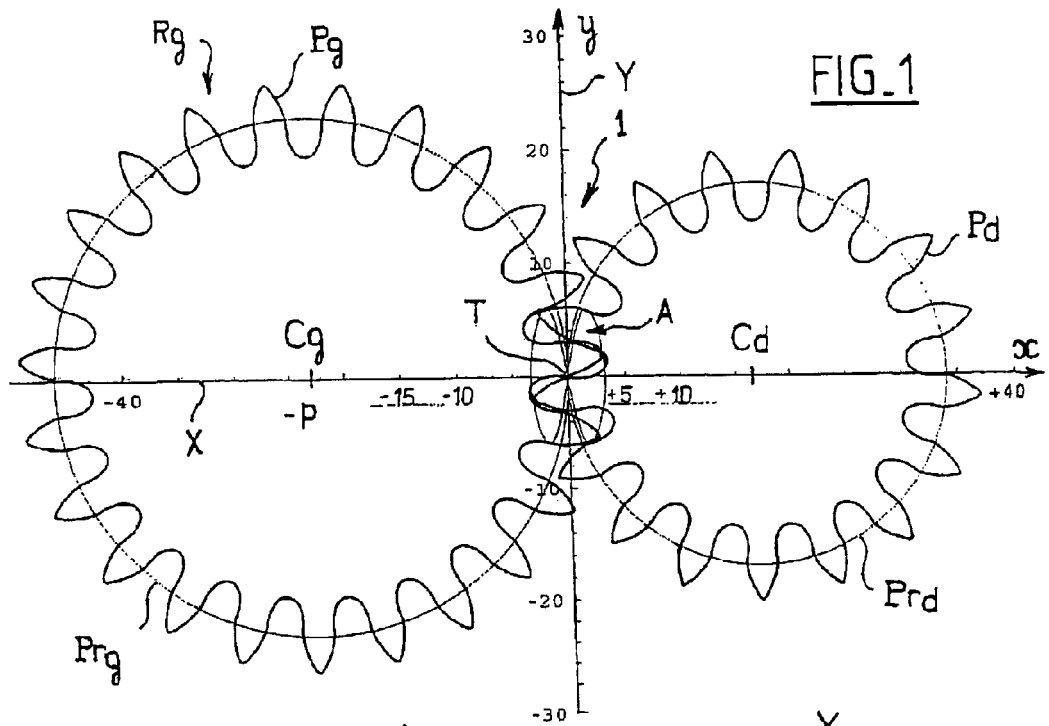
FIG. 1 shows two toothed wheels according to the invention, meshing with one another.

In the example shown in FIGS. 1 to 6, a toothed wheel $R_g$, situated on the left in the drawings, meshes externally with a toothed wheel $R_d$. In the meshing zone 1, the meshing profile $P_g$ of the wheel $R_g$ is in sliding contact via several contact points with the meshing profile $P_d$ of the wheel $R_d$. Each wheel $R_g$, $R_d$ is associated with a respective pitch circle $Pr_g$, $Pr_d$ that is fixed to the associated wheel, has its center $C_g$, $C_d$ on the axis of rotation of the associated wheel, and a diameter proportional to the number of teeth of the associated wheel. The proportionality factor is chosen such that the pitch circles $Pr_g$ and $Pr_d$ are tangent at a pitch point T that is at the intersection between the line of centers X passing through the centers $C_g$ and $C_d$, and the tangent Y common to the two pitch circles $Pr_g$ and $Pr_d$.

The locus of the contact points between the profiles $P_g$ and $P_d$ in the meshing zone is called the action curve. The action curve is a lemniscate A (FIGS. 2 and 3), in other words a curve in the general shape of an 8 or of ∞, having a double point that coincides with the pitch point T, and two lobes, namely a lobe $L_g$ situated entirely on the side of the wheel $R_g$ relative to the common tangent Y, and a lobe $L_d$, situated entirely on the side of the wheel $R_d$ relative to the common tangent Y. The lobe $L_g$ intersects the line of centers X at a point $W_g$ situated between the center $C_g$ and the pitch point T. The lobe $L_d$ intersects the line of centers X at a point $W_d$ situated between the pitch point T and the center $C_d$.

Each of the two lobes $L_g$ and $L_d$ has two apexes situated on either side of the line of centers X, respectively called as $S_{gh}$, $S_{gb}$, $S_{dh}$ and $S_{db}$. These apexes are points of the lemniscate A where, when moving along the lemniscate, a maximum distance between the lemniscate and the pitch point T is passed through. This means that at each of these four apexes, the respective normal N to the lemniscate passes through the pitch point T.

Figure 2:
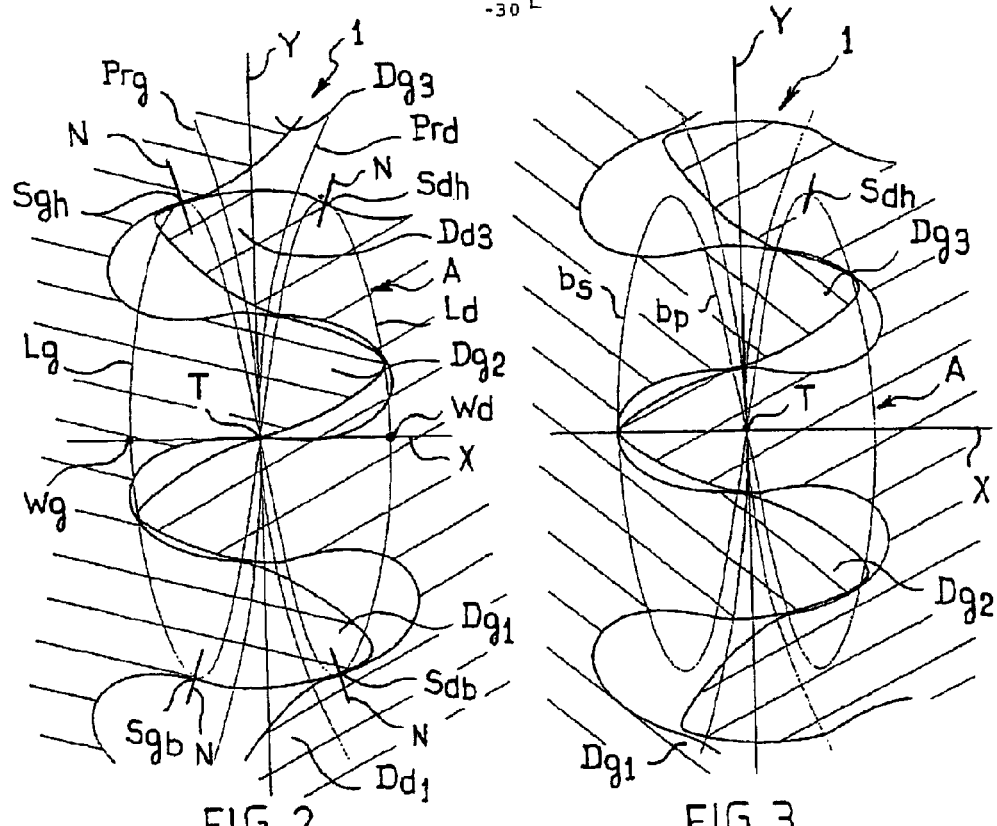
FIGS. 2 and 3 are enlarged views of the meshing zone in two different relative positions of the toothed wheels.
Figure 3:
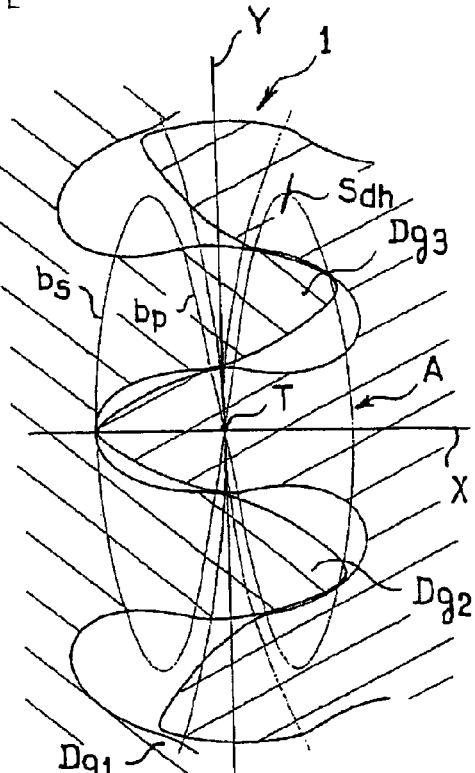

The case is now considered in which, in particular with reference to FIGS. 2 and 3, the teeth of the profiles move downwards in the meshing zone 1, and the wheel $R_g$ is driving. In the situation shown in FIG. 2, the front surface, relative to the direction of the movement, of a tooth $D_{g3}$ is establishing contact with the rear surface of a tooth $D_{d3}$ of the wheel $R_d$ at the moment when the front surface of a tooth $D_{g1}$ of the left wheel $R_g$, situated two teeth ahead on the above-mentioned tooth $D_{g3}$, is losing contact with the rear surface of a tooth $D_{d1}$ belonging to the wheel $R_d$ and being two teeth ahead of the tooth $D_{d3}$.

In this example, in which the angular working travel of a tooth surface thus corresponds to two angular tooth spaces so that there are always two tooth surfaces transmitting the torque on each wheel, the contact ratio factor is said to be exactly equal to 2.

The two arcs, which intersect at the pitch point T, and each extend between two successive apexes, are called principal branches bp of the action curve A. There is therefore a principal branch extending from the apex $S_{gh}$ to the apex $S_{db}$ and a principal branch extending from the apex $S_{dh}$ to the apex $S_{gb}$. between their two ends, the principal branches do not contain any apex, i.e. any extremum of the distance to the pitch point T.

The two arcs that each contain one of the lobes $L_g$, $L_d$ of the lemniscate, and therefore each contain one of the points $W_g$ and $W_d$, are called secondary branches be of the lemniscate.

Figure 4:
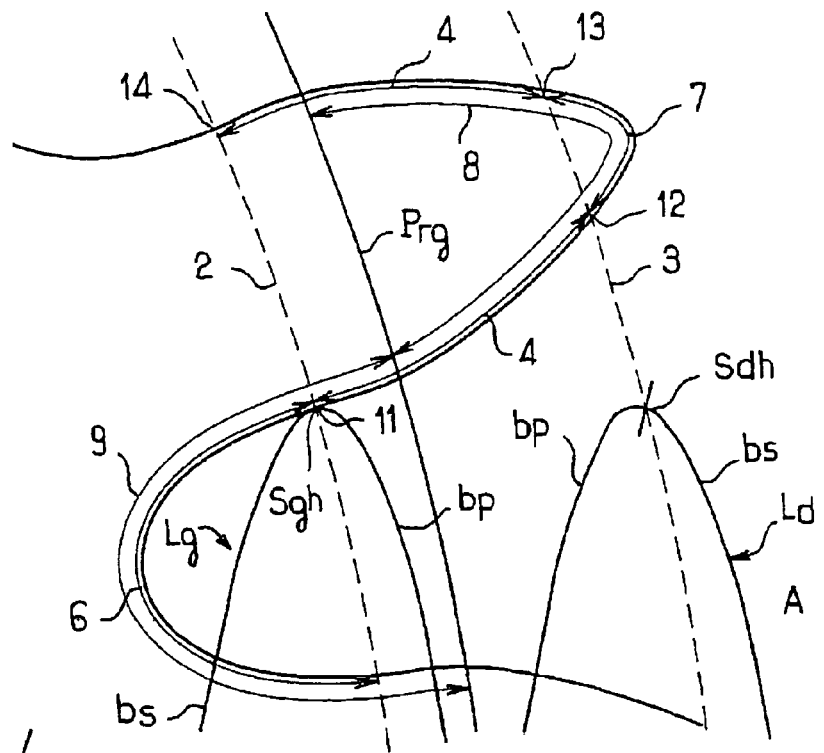
FIG. 4 is an enlarged scale view of a tooth of the toothed wheel on the left in FIGS. 1 to 3, in connection with part of the action curve.
Figure 5:
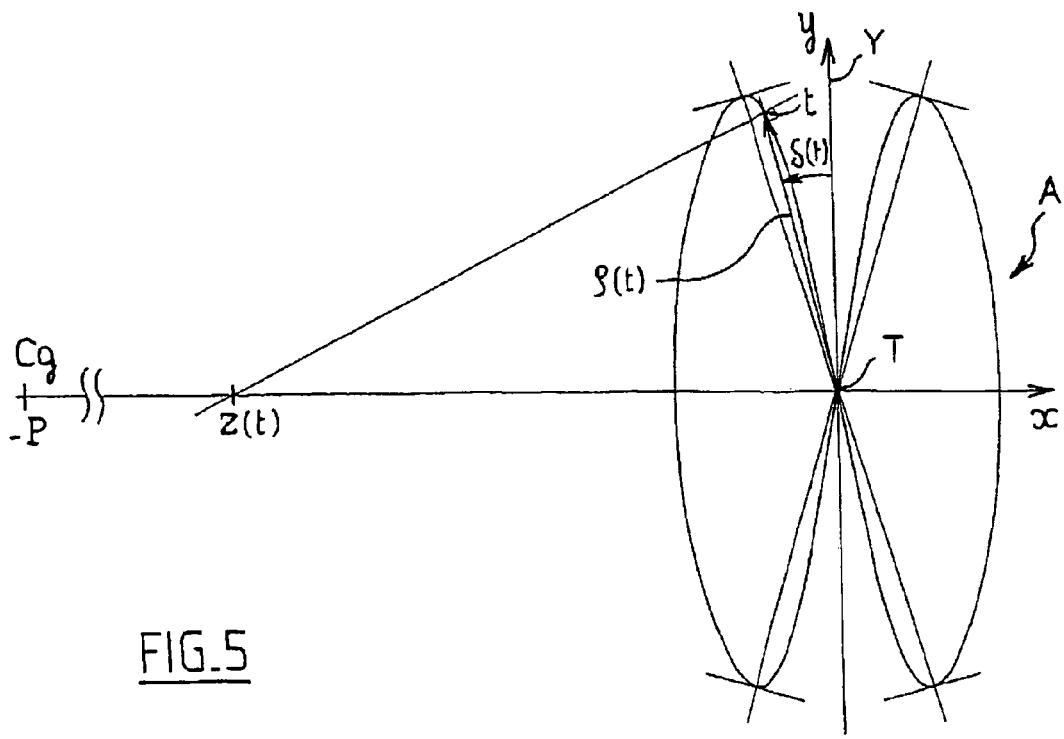
FIG. 5 is a view of the action curve of FIGS. 1 to 4, showing various parameters.

With reference to FIG. 4, the term flanks 4 is used to denote the parts of the meshing profiles that make contact along the principal branches bp of the action curve. These are therefore the parts of the meshing profile that are comprised between on the one hand the circle 2 passing through the apexes such as $S_{gh}$ of the lobe such as $L_g$ situated inside the pitch circle $Pr_g$, and on the other hand the circle 3 passing through the apexes such as $S_{dh}$ of the lobe such as $L_d$ situated radially outside the pitch circle $P_{rg}$ of the wheel concerned. The part of the profile situated radially inside the circle 2 is called the bottom 6, and the part of the profile situated radially beyond the circle 3 is called the crest 7 of the profile. Moreover, the part of the profile situated radially beyond the pitch circle $P_{rg}$, in the case of the wheel $R_g$ shown in FIG. 4, is known as the addendum 8 of the profile, and the part of the profile situated radially inside the pitch circle $Pr_g$, is known as the dedendum 9. Consequently, the addendum comprises the crest 7 and a part of the flanks 4 of a tooth, and the dedendum the remainder of the flanks 4 and the bottom 6.

The contact points located on the addendum 8 have as their locus the lobe $L_d$ located beyond the pitch circle $Pr_g$, and the contact points located on the dedendum 9 have as their locus the lobe $L_g$ located radially inside the pitch circle $Pr_g$.

The contact points located on the crest 7 have as their locus the secondary branch bs of the lobe $L_d$ situated outside the pitch circle, while the contact points located on the bottom 6 have as their locus the secondary branch bs of the lobe $L_g$ situated inside the pitch circle $Pr_g$.

The contact points located on a tooth flank 4 have as their locus one of the principal branches bp of the lemniscate.

Looking at FIGS. 2 and 3, it can be seen that the front surface of the tooth $D_{g3}$ makes contact with the rear surface of the tooth $D_{d3}$ at the apex $S_{gh}$. The contact takes place between on the one hand the point of connection of the front flank with the bottom of the tooth $D_{g3}$ and on the other hand the point of connection of the rear flank with the crest of the tooth $D_{d3}$.

According to the invention, the radius of curvature of the two profiles at these two points is equal to the distance between the apex $S_{gh}$ (where the contact takes place) and the pitch point T, and the orientation of the two profiles at the moment of mutual contact between these two points is such that their center of curvature at the contact point is the pitch point T.

Such a contact, which takes place between two profiles that locally have the same curvature and the same center of curvature, is known as osculating. It corresponds to the vanishing of the contact pressure in the Hertzian approximation.

In FIG. 3, the tooth $D_{g3}$ has rotated by approximately ¾ of a tooth-to-tooth angular distance. The osculating contact has immediately splitted into two simple contacts, one principal contact that moves along the principal branch bp of the lemniscate in the direction of the pitch point T, and moves up along the front flank of the tooth $D_{g3}$ in the direction of the crest of the profile, and another that follows the secondary branch bs of the lemniscate, and moves along the bottom of the profile of the wheel $R_g$, and the crest of the profile of the wheel $R_d$. The secondary contact remains driving until it passes through the line of centers X, where the pressure angle passes through the value $\pi/2$ and where the contact changes from driving to driven. This secondary contact, which is now driven, is lost at the apex $S_{gb}$ of the same lobe ($L_g$) by joining with the preceding driven principal contact in order to form an osculating contact that then disappears.

During this time, the driving principal contact, after having passed through the pitch point T, has changed lobe to disappear at the apex $S_{db}$ of the other lobe $L_d$ situated on the other side of the line of centers X, at the same time as a secondary contact which was created as a driven contact at the apex $S_{dh}$ and has become driving while crossing through the line of centers X.

In FIG. 3, on the rear surface of the tooth $D_{g3}$, the two driven contacts can be seen a short time after they appeared at the apex $S_{dh}$. A little further on, which situation is observed on the preceding tooth $D_{g2}$, the principal driven contact has changed lobe and passed to the lobe $L_g$, and the initially driven contact has passed over the apex of the tooth to become a driving contact between the crest of the tooth $D_{g2}$ and the tooth bottom of the wheel $R_d$.

All of the contacts are created and lost at one or the other of the four lobe apexes, always in the form of osculating contacts. On each elementary profile comprising two flanks, a crest and a bottom, there are therefore four points at which the radius of curvature is equal to the radius vector of the apex where this point will be in osculating contact with a corresponding point of the other profile. These points, designated by 11, 12, 13, 14 in FIG. 4, are the points of connection between the bottom, flank, crest, flank and bottom of the profile.

FIGS. 2 and 3 show that the entire profile is composed of points that at one time or another make contact with the other profile.

A more theoretical description of the meshing system according to the invention will now be considered.

Two plane curves, in particular meshing profiles, are said to be mating if they have sliding contacts between them when they are rotated by proportional angles about two distinct and fixed pivots.

In a conventional manner, two curves, known as pitch curves, which roll without sliding on one another in the relative movement, are attached to the mating profiles. In the homokinetic case, which is the most common application, these curves are (pitch) circles centered on the pivots, and tangent to one another at the pitch point T. The locus of the sliding contacts is known as the action curve(s).

Each contact point has a trajectory corresponding to a part of the action curve.

It is then possible to state the following result, which is formulated in two phrases:
- the profile centered at (−p, 0) results from the driving of the point (ρ(t), δ(t)) of the action curve through the rotation with a center (−p, 0) and an angle ψ(t)/p, where ψ is defined by a differential relationship ψ'(t)=ρ'(t)/cos(δ(t))
- the angle ψ(t) thus defined is the same as p times the phase of the wheel, which means the following: let us consider the wheel in any position in which contact takes place for the value $t_0$ of the parameter t, and let it be rotated a little while following the contact by continuity; the parameter of the contact point is now $t_1$. Then the angle by which the wheel has rotated is (ψ($t_1$) ψ ($t_0$))/p.

A similar expression is obtained when the toothed component is a rack, by changing to the limit p→∞; the limits for the positive and negative p's are the same. In the above proposition, "the rotation with a center (−p, 0) and an angle ψ(t)/p" must be replaced by: "the translation with an amplitude ψ(t) along the longitudinal direction of the rack".

The following expression is therefore obtained for the Cartesian coordinates (x(t), y(t)) of the wheel profile:

$$x(t) = p\left(\cos\left(\frac{\psi(t)}{p}\right) - 1\right) + \rho(t)\sin\left(\delta(t) + \frac{\psi(t)}{p}\right)$$

$$y(t) = p\sin\left(\frac{\psi(t)}{p}\right) - \rho(t)\cos\left(\delta(t) + \frac{\psi(t)}{p}\right)$$

where:

p is a positive or negative integer, −p is the abscissa of the center of rotation and |p| is the number of teeth, δ(t), ρ(t) are the polar coordinates of the point (t) of the action curve in a system centered on the pitch point, the polar axis of which is tangent to the pitch circle, the polar angle of which is in the interval [0, π] and the radius vector is positive on one lobe and negative on the other, $$\psi(t) = \int_{t_0}^{t} \frac{\rho'(\tau) d\tau}{\cos(\delta(\tau))}$$

the arbitrary on the lower bound $t_0$ of the integral corresponds to one rotation of the wheel about its pivot.

This simple and general result has decisive implications for the production of gears.

Among the conditions set for the action curve, there are those that ensure the local regularity of the profiles. This is achieved by making the curvature of the profile having a finite value everywhere, and a convenient way to do this is to consider the abscissa z(t) of the point of intersection between the line of the pivots (horizontal) and the normal to the action curve at the point t (see FIG. 5).

Let the profile of the wheel centered at the point (−p, 0) be called the profile of order p (p is a positive or negative integer). The expression of its curvature γ(t) is (up to the sign):

$$\gamma(t) = \frac{1}{\rho(t) + \frac{p\sin(\delta(t))\rho'(t)}{p\cos(\delta(t))\delta' + \rho'(t)}}$$

It is noted that ψ(t) has been eliminated and that the curvature of the profile is expressed in the coordinates of the action curve and their derivatives. At the pitch point T, for the value $t_0$ of the parameter where ρ(t) vanishes, this expression is reduced to:

$$\gamma(t_0) = \frac{1}{\sin(\delta(t_0))}\left(\frac{1}{p} + \cos(\delta(t_0))\frac{\delta'(t_0)}{\rho'(t_0)}\right)$$

Let z(t) now be introduced into the curvature; the following expression is obtained, in which the derivatives no longer appear because they are absorbed into the expression of z(t):

$$\gamma(t) = \frac{1}{\rho(t)} - \frac{p\sin(\delta(t))z(t)}{(p+z(t))\rho(t)^2}$$

In order to exclude the angular points, corresponding to infinite curvature, it must be provided that:

z(t) must not become equal to −p, i.e. the normal to the action curve must not pass through the pivot, except for δ(t)=π/2

The difference in the curvatures has the general form (still up to the sign):

$$\gamma_p(t) - \gamma_q(t) = \frac{(p-q)\sin(\delta(t))z(t)^2}{(p+z(t))(q+z(t))\rho(t)^2}$$

It can then be seen that in addition to the above condition, there is also z(t)≠−q, which prevents the normal from intersecting the line of centers X on the pivot of the other wheel.

It can therefore be seen that the finitude of the curvature requires that z(t) does not become equal to −p, which is the abscissa of the pivot. This is the first condition of regularity: outside δ=π/2, the normal to the action lemniscate must not pass through the pivots.

Moreover, the simple integrability of ψ'(t) supposes that in the vicinity of the $t_1$'s for which δ($t_1$)=π/2, the function ρ'(t) vanishes fairly quickly. The lemniscate therefore arrives orthogonally on the line X of the pivots and the limit positions z($t_1$) are the same as the centers of curvature of the lemniscate, and it is often preferred that these centers are merged (that the curvature is continuous at δ=π/2), this is the second condition:

At δ=π/2, the curvature of the action lemniscate must be continuous, the center of curvature must be situated on the line of the pivots and must not coincide with one of them.

The first condition of regularity confirms the drawbacks of the known involute teeth. The action curves are in this case line segments tangent to the base circle (the one that is developed) and the length of these segments is limited by the point of tangency with the base circle, since at this point of tangency the normal passes through the pivot, the curvature of the tooth diverges, and therewith the Hertzian pressure at the contact. According to the invention, the action curve is gently incurvated in order to avoid this situation where the normal to the action curve comes too close to a pivot. It is then possible to lengthen the action curve and thus to increase the contact ratio factor, which has very concrete consequences. In fact, it is useful to incurvate the action curve until its normal passes through the pitch point T.

In addition to the conditions of local regularity that have just been explained, the action lemniscate is subject to an integral condition associated with the choice of scale according to which it was decided to center a wheel with |p| teeth at point (p, 0).

When the wheel makes a complete rotation, the angle $\psi$ varies by $2p\pi$. The average per tooth is therefore $2\pi$, and this average can be written as the integral of $\psi'(t)$ along a complete circulation along the lemniscate, hence:

$$\int_L \frac{\rho'(t)\,dt}{\cos(\delta(t))} = 2\pi$$

As it is still possible to adjust this integral by a homothetic transformation of the type $\rho(t) \to a\rho(t)$ with an appropriate "a", it can be seen that this condition of integrality determines the size of the action curve when its shape, which will now be described, has been provided.

It is possible to suppose, for example, that the parameterization of the lemniscate is such that t varies by $2\pi$ for a complete circulation. The integrand $\rho'(t)/\cos(\delta(t))$ is then a periodic function the average of which is not zero and is 1 as a result of the condition of integrality. The aspect of the primitives of such functions is well known: they are the sum of a linear function (the slope of which is equal to the mean) and of a periodic function with the same period as the integrand. In other words, the curve that represents $\psi(t)$ is a periodic modulation of the first diagonal (see FIGS. 6, 7 and 8).

As has been seen, the angle $\psi(t)$ is involved on the one hand in the analytical expression of the profile, and on the other hand constitutes (up to the factor 1/p) the phase of this profile. Let us therefore consider the graph of the function $\psi$ and an intersection of this graph with a horizontal straight line that will be shifted. This straight line passes through a point of intersection $(t_0, \psi(t_0))$ such that the point of the profile corresponding to this value $t_0$ of the parameter is a possible contact point for the wheel.

If the horizontal now shifts by a small $\Delta\psi$, the abscissa $t_1$ of the new point of intersection is the parameter on the wheel of the new potential contact after the wheel has rotated by $\Delta\psi$.

Thus, after adjustment of a global phase (the constant of integration in $\psi(t)$), the intersections of the graph of $\psi$ with the horizontals indicate the possible contacts of the profile. It can be seen that the qualitative situations depend on the "depth of modulation" of the graph of $\psi$.

The lemniscate is chosen such that the derivative of $\psi(t)$ vanishes periodically, therefore $\psi(t)$ has local minima and maxima. According to the definition of $\psi(t)$, this occurs when the radius $\rho(t)$ of the lemniscate passes through an extremum at a $\delta$ different from $\pi/2$. At such a point, $\rho'(t)$ vanishes and the normal to the lemniscate passes through the double point.

As regards the function $\psi(t)$, the number of its intersections with a mobile horizontal is variable.

Figure 6:
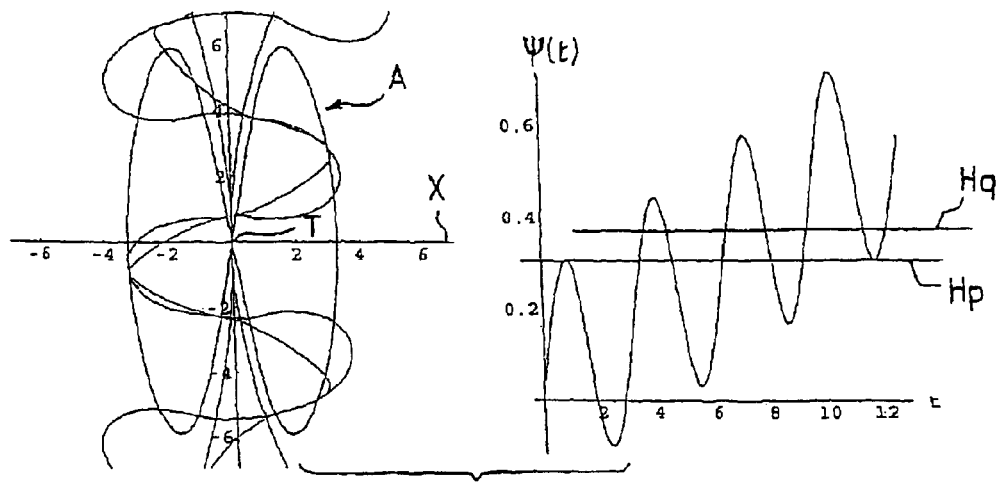
FIG. 6 is a view similar to FIG. 3 opposite a graph of the function ψ(t) for the embodiment of FIG. 7.
Figure 7:
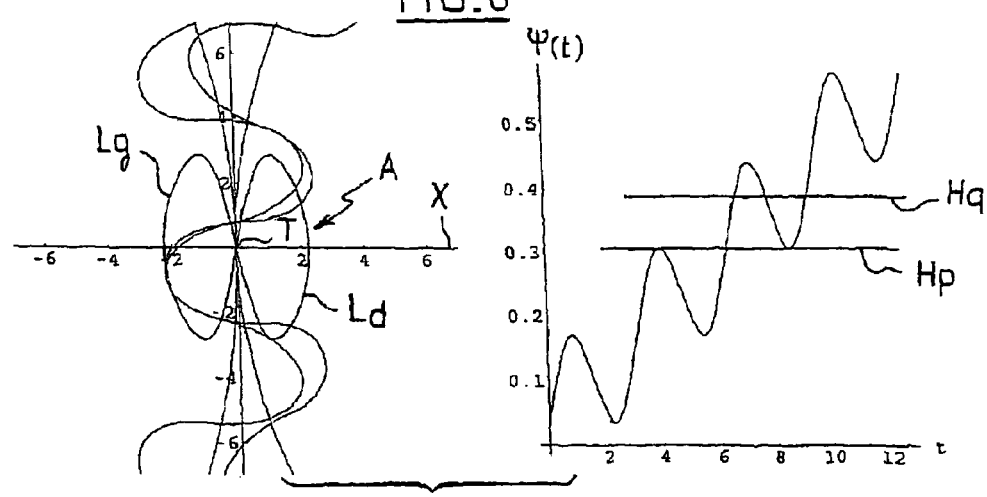
FIGS. 7 and 8 are views similar to FIG. 6, but for two other embodiments.

In the example in FIG. 6, which corresponds to the geometry in FIGS. 1 to 5 where the contact ratio factor is exactly equal to 2, it can be seen that any horizontal straight line $H_q$ intersects the graph at 7 points, each corresponding to one of the 7 contact points visible in the meshing zone such as shown on the left of the graph in FIG. 6.

The horizontal passes through particular positions $H_p$ where a contact is lost to the left of the graph on a local maximum of the graph, while a contact appears on a local minimum to the right of the graph. The simultaneity of these two events on the same horizontal $H_p$ is due to the fact that the contact ratio factor is an integer in this example.

Each time the straight line H passes through a local minimum of $\psi(t)$, a double contact is established that immediately splits into two simple contacts, one of which (the principal contact) moves upwards towards the large t's along the increasing branch and the other (the secondary contact) moves back towards the small t's along the decreasing branch, before being eliminated when passing through a double contact at a local maximum, with the principal contact attached to the preceding increasing branch.

Along the graph of the function $\psi(t)$, the principal branches of the lemniscate are associated with the principal contacts that move on strictly increasing segments of the graph. The secondary contacts move on the complementary segments, which are on average decreasing.

When moving along this graph, the principal contacts associated with the two principal branches of the lemniscate are alternatively passed through. Each of these branches is (entirely) driving or driven. By contrast, the secondary contacts change from driving to driven or vice versa when they intersect the line of the pivots, i.e. at $\delta = \pi/2$.

Thereby to provide meshing continuity, whatever the position of a wheel, said wheel must come into contact with the other by at least one driving contact and at least one driven contact. This is the case in the solution shown in FIG. 7, corresponding to a contact ratio factor exactly equal to 1.

Examining the graph of $\psi(t)$ and considering the above definitions, it can be seen that meshing continuity cannot be ensured without at the same time ensuring it through the principal contacts alone.

For this purpose it is sufficient for any horizontal line $H_q$ to intersect the graph of $\psi(t)$ at least two consecutive principal contacts (because they are alternatively driving and driven).

The term contact ratio factor (driving or driven) refers to the number of contacts (driving or driven) that two meshing gears have with each other. The meshing continuity therefore requires that the two contact ratio factors are greater than or equal to one. It is possible to demonstrate that each contact ratio factor is the division by $2\pi$ of the variation of $\psi$ along the principal arc of the same name (driving or driven).

In other words, they are:

$$\int_{t_1}^{t_2} \frac{\rho'(t)\,dt}{\cos(\delta(t))} \text{ with } \rho'(t_1) = \rho'(t_2) = 0,$$

$t_1$ and $t_2$ corresponding to two points of the same principal branch, situated on either side of the pitch point, and such that $\rho'(t)$ does not vanish between them.

The two contact ratio factors are not necessarily equal. However there is equality under the sufficient condition that the line of the pivots X is an axis of symmetry for the action lemniscate A. This is the case of the lemniscates considered thus far.

The example in FIGS. 7 and 9 to 11 is that of a lemniscate with lobes $L_g$ and $L_d$ that are relatively wide along the X axis. The corresponding teeth have a quasi-sinusoidal appearance.

Figure 8:
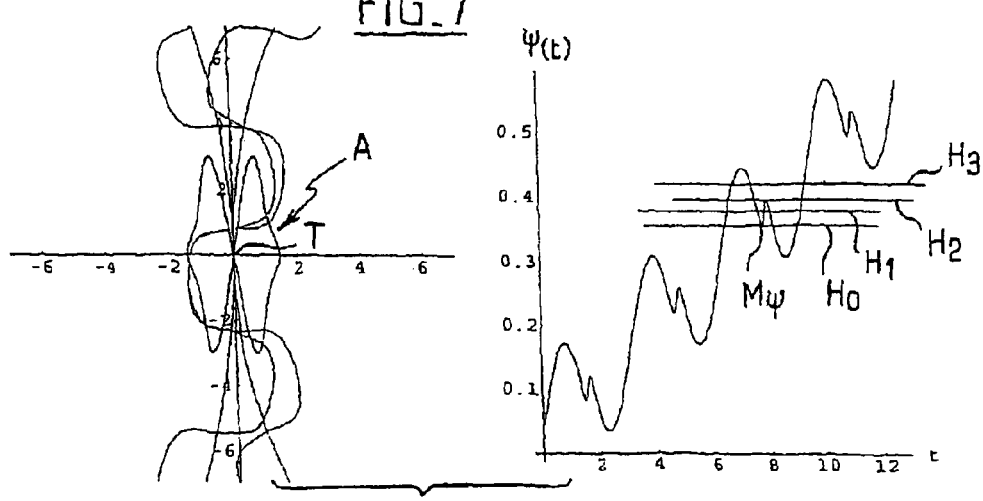
Figure 9:
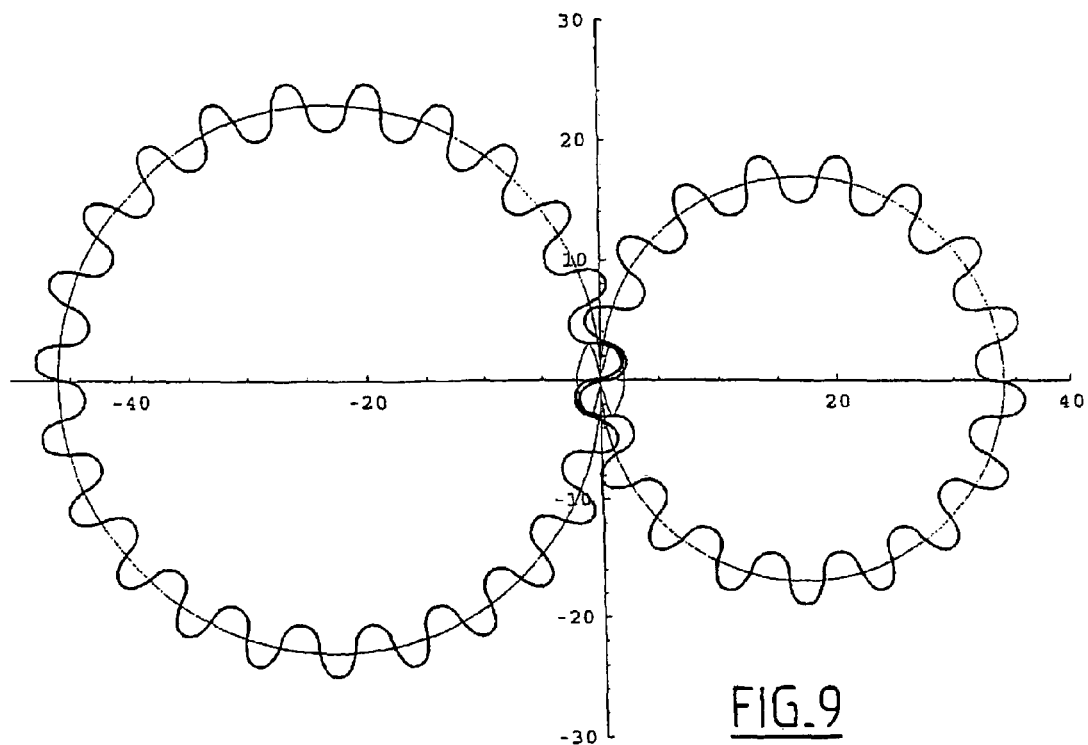
FIGS. 9 to 11 are three views similar to FIGS. 1 to 3, but for the embodiment according to FIG. 7.
Figure 10:
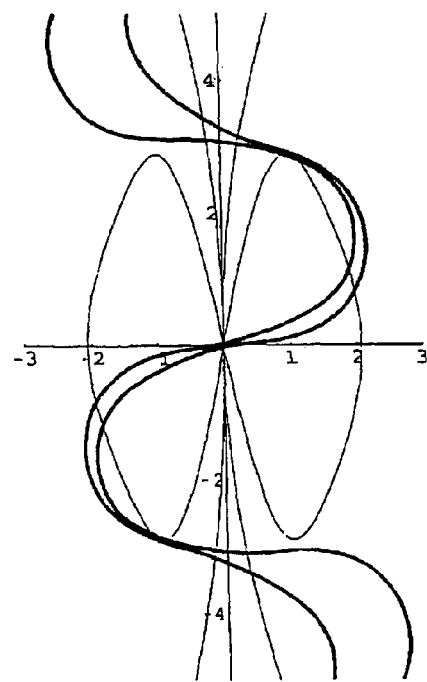
Figure 11:
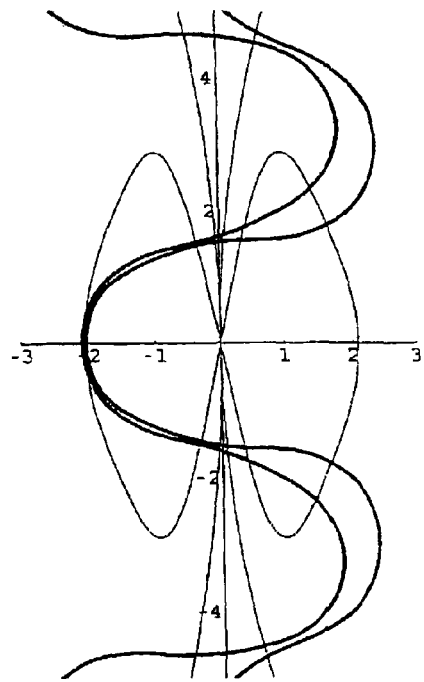

In the example in FIGS. 8 and 12 to 14, the width of the lobes $L_g$ and $L_d$ has been reduced and the condition of integrality described previously has led to the appearance on the secondary branches bs of the lemniscate, on either side of the X axis, of the points $M_{gh}$, $M_{gb}$, $M_{dh}$, $M_{db}$ where $\rho(t)$ takes a minimum local value, i.e. where $\rho'(t)=0$. The existence of these local minimums is shown on the curve $\psi(t)$ by corresponding local minimums $M_\phi$ (FIG. 8). When the horizontal reaches a position $H_0$ passing through such a minimum $M_\phi$, a contact appears on the local minimum of the lemniscate, then splits into two contacts (position $H_1$, corresponding approximately to the relative position in FIG. 14), after which one of these two contacts will join with another contact and disappear (position $H_2$), then there is a return ($H_3$) to the conventional situation of a configuration with a contact ratio factor equal to 1.

Such an action curve gives flat, shallow teeth having the appearance of a rectangle or square with curved sides and rounded apexes.

Thus, the invention makes it possible to design gears that have the noteworthy property that contact is established by means of osculation, therefore at zero Hertzian pressure.

These gears are completely defined by their action lemniscate.

The contact ratio factors are limited only by the number of teeth.

The lemniscate is constrained locally by the conditions of regularity and globally by the condition of integrality. A compromise must be made between three requirements:

- to minimize the pressure along the principal branches of the action curve. This requires that the normal does not come too close to the pivot of the wheel along the two principal half-branches inside the pitch circle of the wheel concerned.
- to ensure that the establishment of contact takes place at a point where the tooth is not too thin and that is not too close to the apex of the crest. This requires that the normal does not come too close to the pivot of the wheel along the secondary branch outside the pitch circle of the wheel concerned.
- to optimize the contact ratio factors, the extension of which requires a lemniscate extended in the direction of the Y axis, while its thinning comes into conflict with the two preceding points and the condition of integrality must be respected.

It can be seen that there does not exist a "universal" choice of teeth that depends only on the order of the wheel. The choice of the profile must depend on the orders of the two meshing gears, because for each of them, the curvature on the flanks is controlled by the two ipsilateral principal half-branches of the lemniscate, and the shape of the crest by its contralateral secondary branch.

Figure 15:
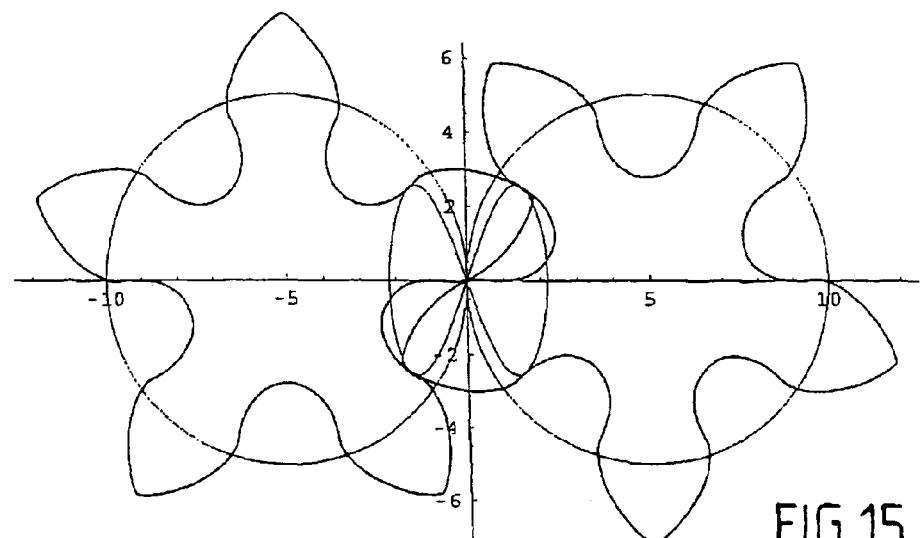
FIG. 15 is a view of a fourth embodiment of a gear according to the invention.
Figure 16:
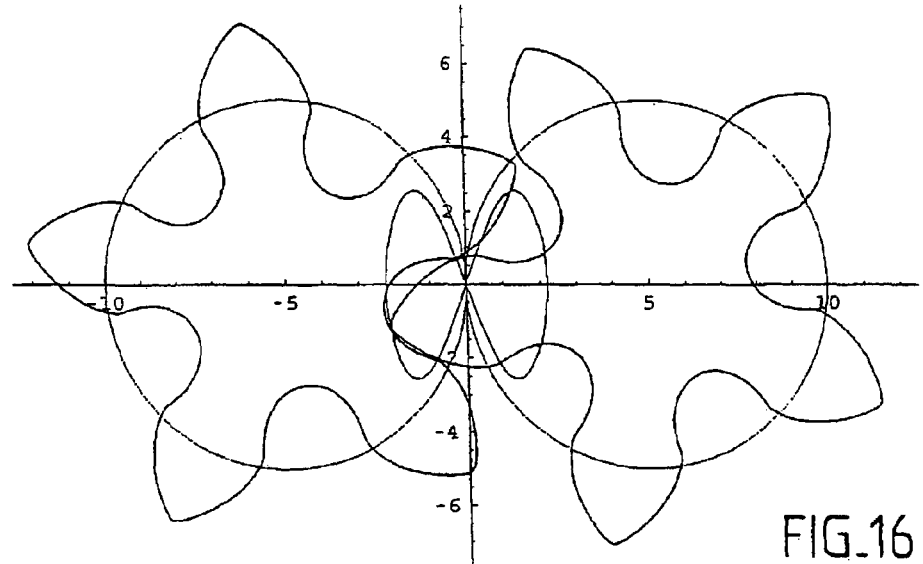
FIGS. 16 and 17 are views of the embodiment in FIG. 15, in two other relative positions of the toothed wheels.
Figure 17:
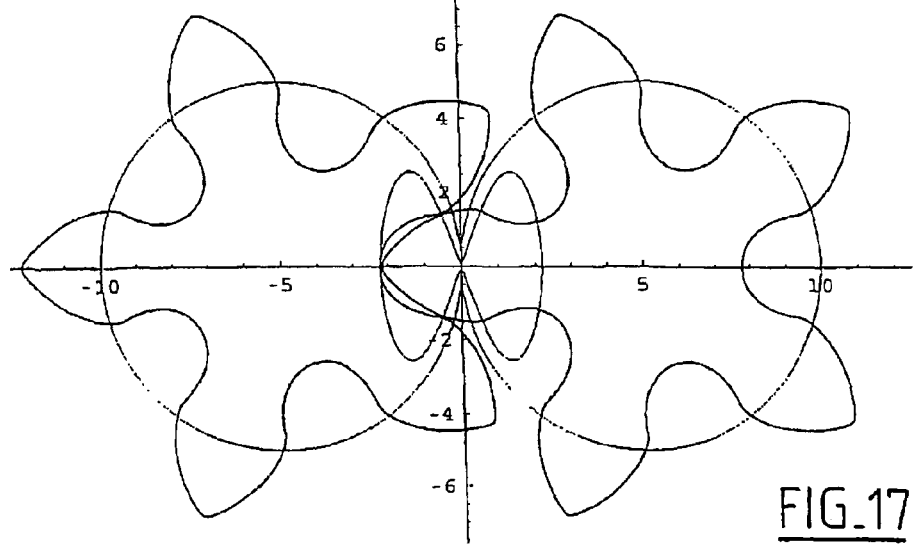

The example in FIGS. 15 to 17 shows the possibility of producing a gear according to the invention, having in this example a contact ratio factor equal to 1, having a particularly low number of teeth for each wheel, namely five teeth for each wheel in this example.

Each tooth has a slight narrowing or neck at its base, this neck being followed by an addendum in the form of an ogive.

The examples in FIGS. 18 to 20 by contrast illustrate wheels with numerous teeth, with a contact ratio factor of 6 in FIG. 18, 5 in FIG. 19 and 4 in FIG. 20.

Figure 23:
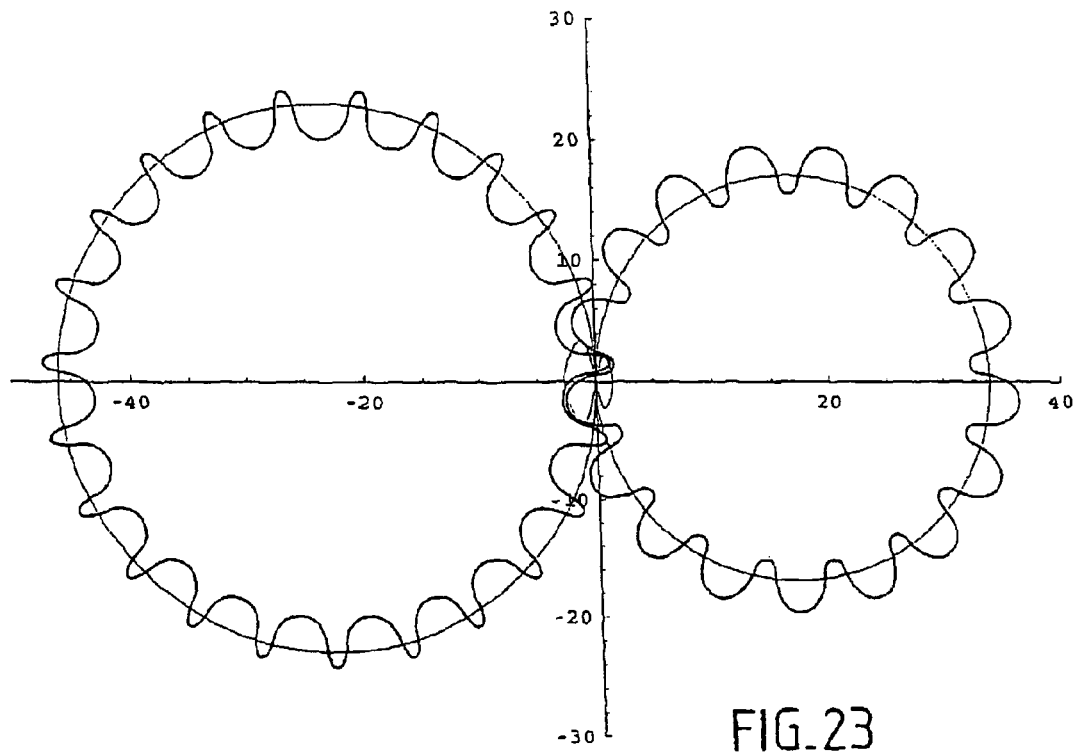
FIGS. 23 and 24 show two gears according to the invention respectively having the asymmetric action curves of FIGS. 21 and 22.

FIG. 21 shows an action lemniscate A that is symmetrical relative to the line of the pivots X but asymmetrical relative to the common tangent Y. FIG. 23 shows the corresponding gear. The toothed wheel situated on the side of the wide lobe of the lemniscate has dedenda covering a wider angular range than the addenda. On the other toothed wheel, situated on the side of the narrower, shorter lobe, the addenda cover a wider angular range than the dedenda.

This solution can be advantageous when the two toothed components are made of different materials, the wider lobe being situated on the side of the wheel the material of which is the strongest, and the teeth of which can consequently be thinner. It can also be advantageous for improving the compromise between the three requirements mentioned above when the transmission ratio between two external teeth is very different to 1, or for an internal gear or a rack gear.

The action lemniscate A shown in FIG. 22 is symmetrical relative to the pitch point T, but asymmetrical relative to each of the X and Y axes. The X axis splits the area of each lobe into two partial unequal areas.

Figure 24:
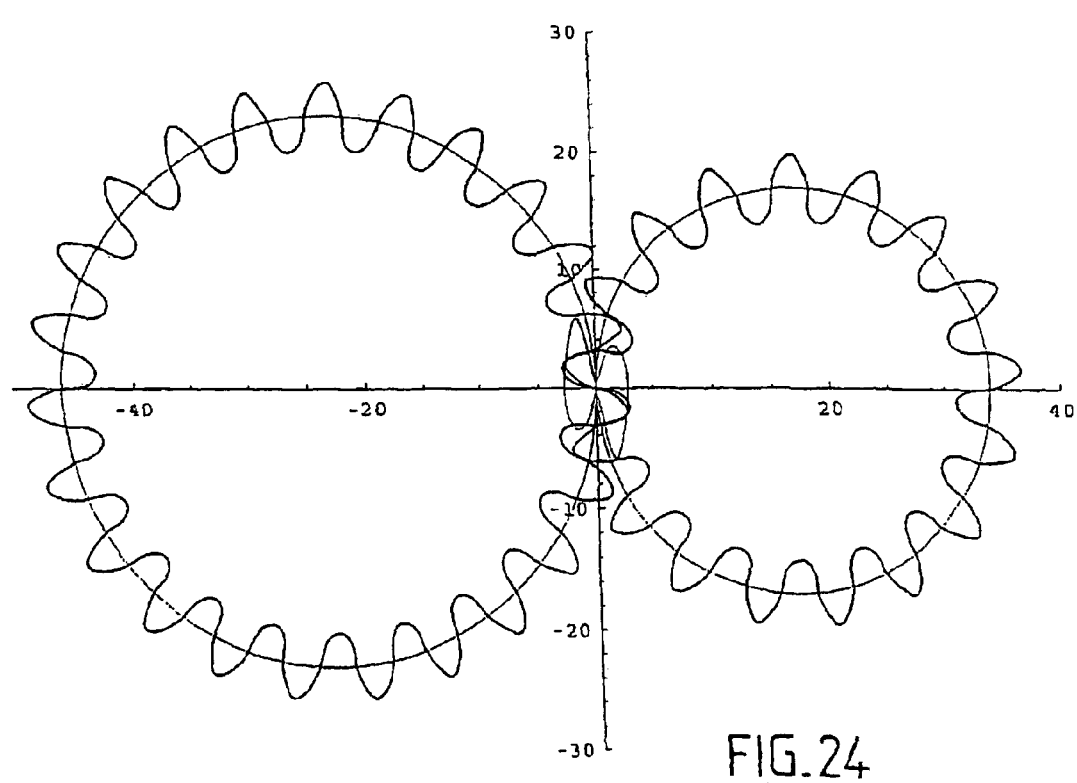
Figure 25:
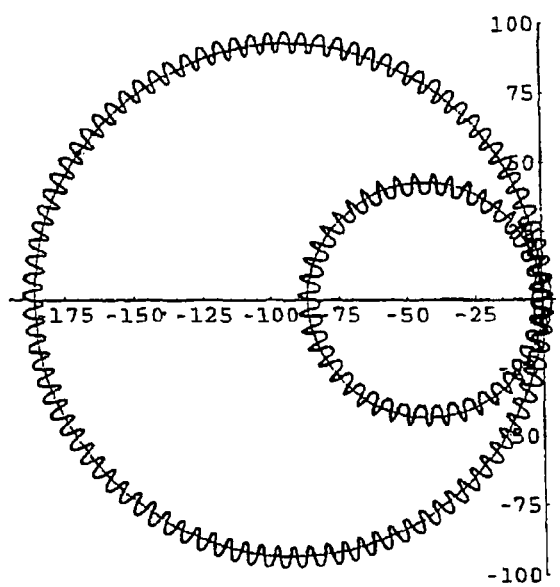
FIGS. 25, 26 and 27 are three views similar to FIGS. 1 to 3, but for an internal gear according to the invention.
Figure 28:
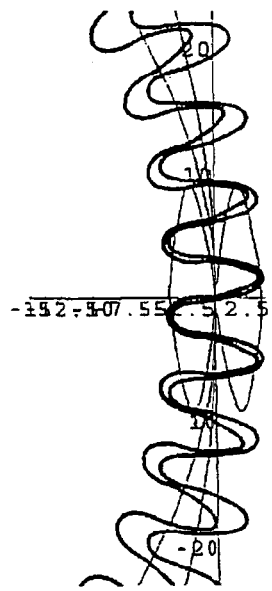
FIG. 28 is an intermediate scale view of the meshing zone of the embodiment in FIGS. 25 to 27.
Figure 26:
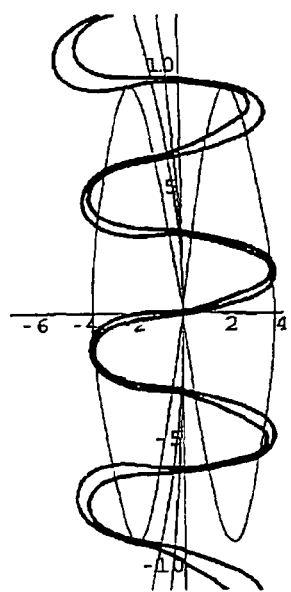
Figure 27:
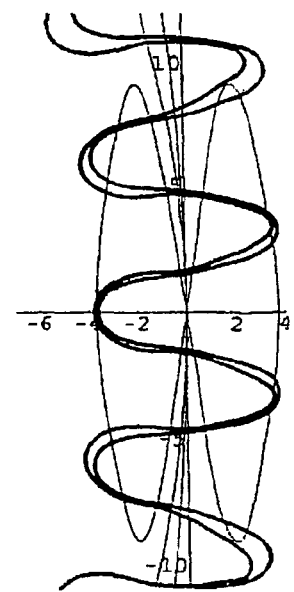
Figure 29:
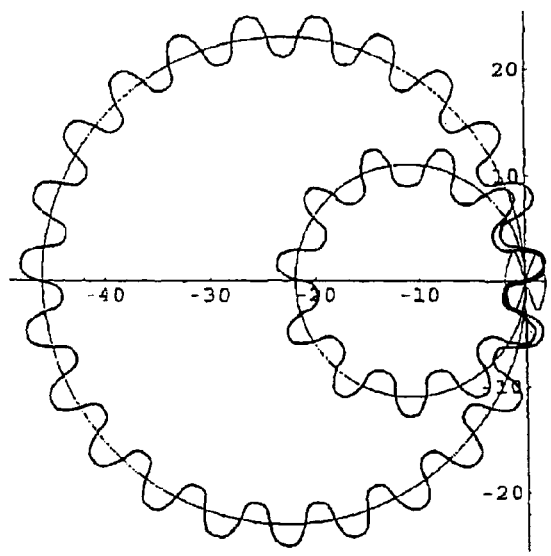
FIGS. 29 to 32 are views similar to FIGS. 25 to 28, but for another embodiment of an internal gear.
Figure 32:
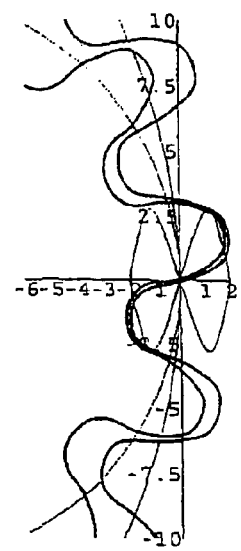
Figure 30:
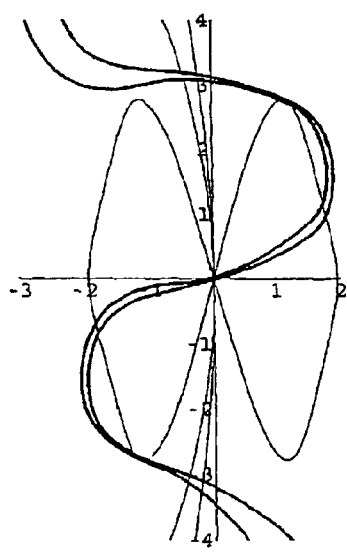
Figure 31:
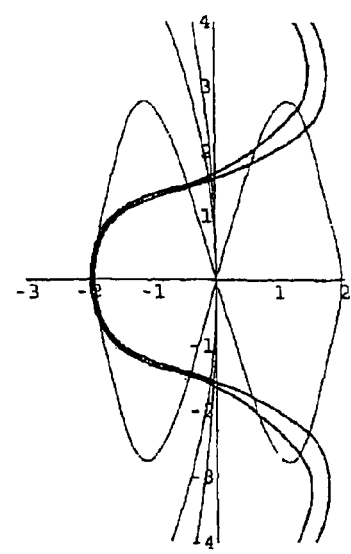
Figure 33:
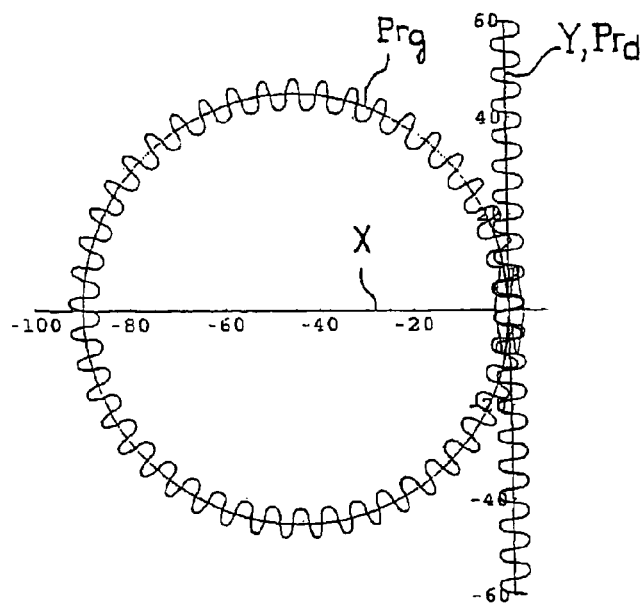
FIGS. 33 to 36 are views similar to FIGS. 25 to 28, but for a rack and pinion gear according to the invention; and, FIGS. 37 to 40 are views of another embodiment of a rack and pinion gear according to the invention, in four different relative positions.
Figure 36:
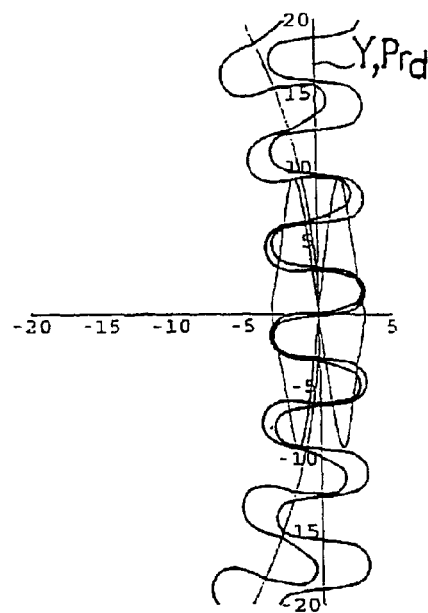
Figure 34:
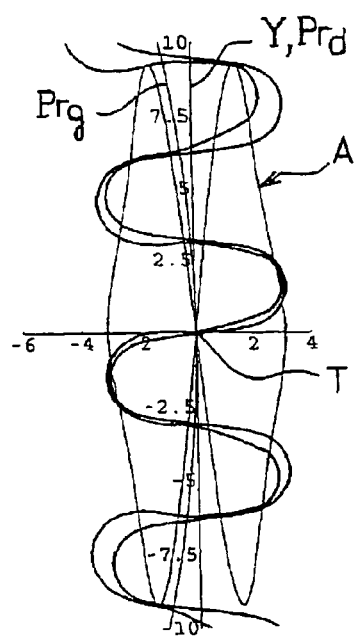
Figure 35:
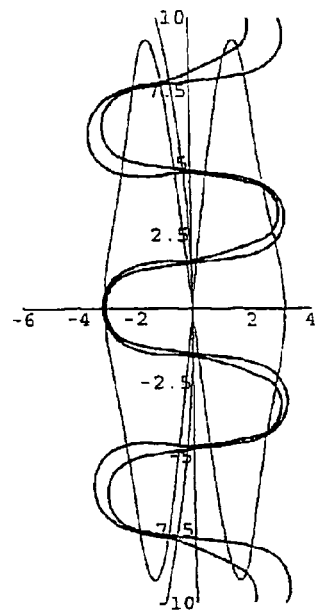
Figure 37:
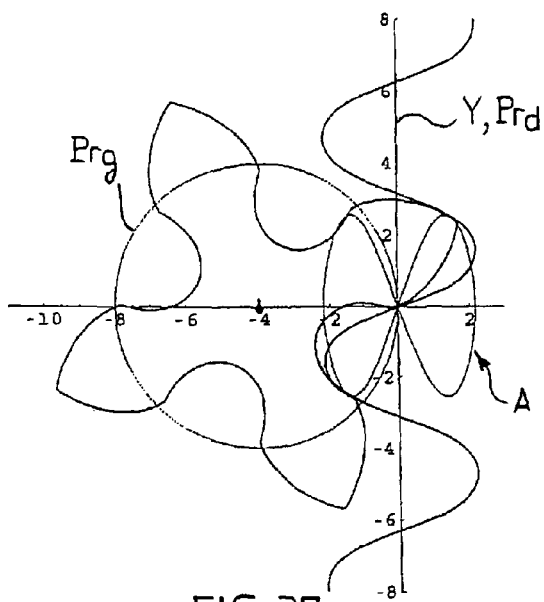
Figure 38:
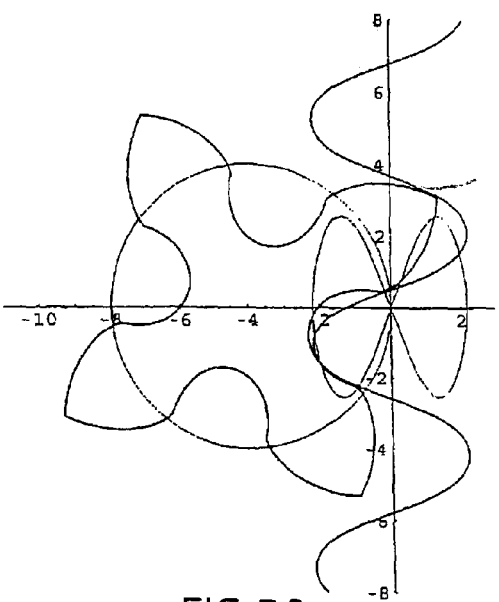
Figure 39:
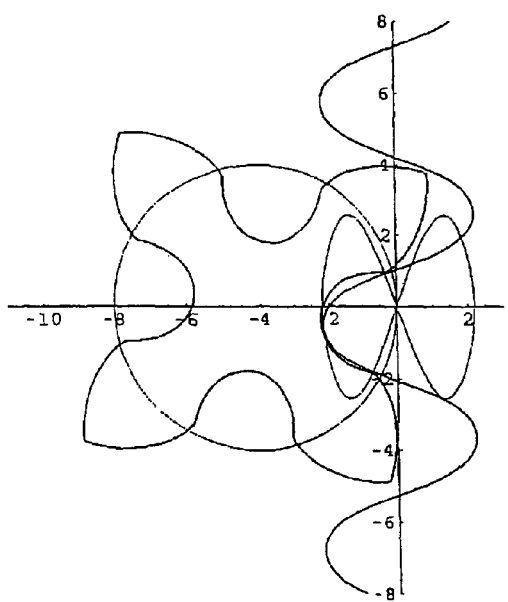
Figure 40:
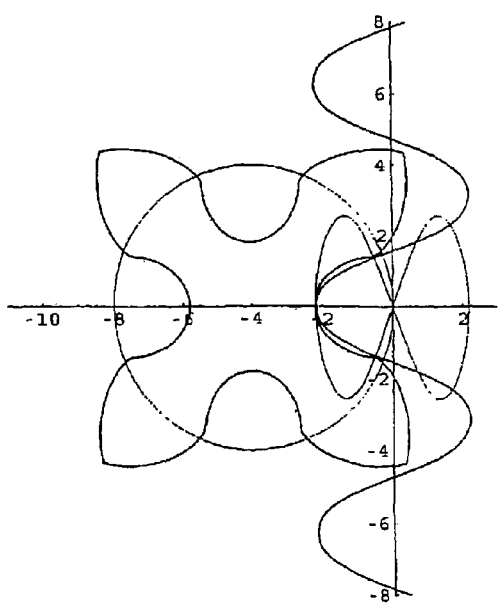

A gear having such an action curve is shown in FIG. 24. The teeth are asymmetrical relative to a radius passing through their apex. The contact ratio factor is not the same in the two directions of torque transmission. Such a gear can be advantageous in the case where the torque is applied exclusively or more frequently in one direction, or in the case where the torque in one direction is greater than in the other direction. Such is the case for example for the gears in gearboxes for motor vehicles, the maximum torque of which in the engine braking direction only reaches approximately 20% of the maximum torque in the direction in which the engine is propelling the vehicle.

FIGS. 25 to 32 illustrate two examples of internal gears. The conditions given above are the same for an internal gear and an external gear. They guarantee in particular the absence of interference between the profiles for external gears, rack gears and internal gears with a large transmission ratio of the order of approximately 3 and higher. However, as is known, interference problems are generally more difficult to solve in the case of internal gears, in particular between the teeth situated outside the meshing zone. In the case of an internal gear and if the numbers of teeth are too close to one another, it should also be checked graphically that no interference problem arises outside the meshing zone.

The embodiment in FIGS. 25 to 28 corresponds to a contact ratio factor of 3, with a relatively high number of teeth.

In the example in FIGS. 29 to 32, the number of teeth is smaller and the contact ratio factor is only equal to 1.

FIGS. 33 to 40 show two embodiments in which the gear comprises a wheel with external teeth meshing with a rectilinear rack. In such a case, the pitch curve of the rack becomes the straight line Y, as a circle centered at infinity. In the example in FIGS. 33 to 36 there is a relatively large number of teeth and the contact ratio factor is equal to 3.

By contrast, in the example in FIGS. 37 to 40, the pinion only comprises four teeth in the form of an ogive preceded by a neck, as in FIGS. 15 to 17, and it meshes with a rack the teeth of which have a quasi-sinusoidal appearance. The contact ratio factor is equal to 1.

All of the examples that have just been described thus make it possible to define a lemniscate that shows desired properties for a given gear. This lemniscate in turn makes it possible to define the toothed components that are to cooperate, as a function of their number of teeth.

As one of the conditions of regularity is that the normal to the lemniscate for the points other than those corresponding to $\delta=\pi/2$ do not pass through the pivot of wheels, a lemniscate that satisfies the conditions of regularity for one of the wheels may not satisfy the conditions of regularity for the other wheel if the number of teeth on the latter is different.

Apart from this reservation, and the checking of the absence of interference problems for internal gears, all of the toothed components having the same action curve are compatible with each other. The notion of the same action curve means that the two action curves must be exactly superimposed when the toothed components mesh with one another. Consequently, in the case of asymmetric action curves, in particular the case in FIG. 21, an external gear must be composed of a toothed wheel the action curve of which has its wide lobe inside the pitch circle with a toothed wheel the action curve of which has its narrow lobe inside its pitch circle.

Of course the invention is in no way limited to the examples described and shown.

It is in particular possible to cut away the profiles in order to eliminate certain unnecessary contacts.

For example, in the example in FIGS. 2 and 3, in the radial direction, the crest of the teeth could be slightly shortened in order to eliminate the contacts along the secondary branches of the lobes of the lemniscate, at least the unnecessary part in the deepest part of the tooth space or in the zone where this contact becomes driven, if the direction of transmission of load is always the same.

The toothed components according to the invention can be produced with helical teeth, with a fixed or variable pitch along the axis.

It is also possible to vary the meshing profile along the axis.

The invention claimed is:

1. A toothed component selected from a gear rotatable about an axis and a rack, said toothed component comprising teeth that are bounded by a meshing profile that during meshing comes into contact with a mating profile of a compatible toothed component, at contact points that move along a locus called an action curve, while the meshing profile and the mating profile respectively have a same speed as two pitch lines each attached to one respectively of the meshing profile and the mating profile, said two pitch lines moving without sliding on one another at a pitch point that is fixed relative to the action curve, wherein the action curve has at least one apex where a distance $\rho(t)$ between the action curve and the pitch point has a maximum value, wherein the meshing profile has at least one point where a radius of curvature of the meshing profile is equal to said maximum value, wherein said one point of the meshing profile passes through said apex of the action curve in an orientation in which, at said one point of the meshing profile, a center of curvature of the meshing profile coincides with the pitch point, and wherein in a coordinate system an abscissa axis of which is a normal common to the pitch lines at the pitch point, and an ordinate axis of which is a tangent common to the pitch lines at the pitch point, Cartesian coordinates of a curve defining the meshing profile at least in a region of the meshing profile, said region including at least said one point and a vicinity of said one point, are:

$$x(t) = p\left(\cos\left(\frac{\psi(t)}{p}\right) - 1\right) + \rho(t)\sin\left(\delta(t) + \frac{\psi(t)}{p}\right)$$

-continued
$$y(t) = p\sin\left(\frac{\psi(t)}{p}\right) - \rho(t)\cos\left(\delta(t) + \frac{\psi(t)}{p}\right)$$

in which expressions:

$\delta(t), \rho(t)$ are polar coordinates of a point (t) of the action curve in a system centered on the pitch point, a polar axis of which is tangent to the pitch line, a polar angle of which is in an interval [0, π] and a radius vector is positive on one lobe and negative on an other, $$\psi(t) = \int_{t_0}^{t} \frac{\rho^t(\tau)d\tau}{\cos(\delta(\tau))}$$

$t_0$ is an arbitrary number expressing a corresponding arbitrary position of the toothed component, if the toothed component is said gear, p is a positive or negative integer, –p is the abscissa of the center of rotation and |p| is the number of teeth of the toothed component, if when the toothed component is said rack, p is infinite.

2. The toothed component according to claim 1, wherein normals to the action curve intersect said normal common to the pitch lines at positions located apart from a center of rotation of the toothed component.

3. The toothed component according to claim 2, wherein the action curve has a continuous curvature in at least one region where the action curve intersects said normal common to the pitch lines at a distance from the pitch point.

4. The toothed component according to claim 3, wherein the action curve intersects at a right angle said normal common to the pitch lines at a distance from the pitch point.

5. The toothed component according to claim 2, wherein the action curve intersects at a right angle said normal common to the pitch lines at a distance from the pitch point.

6. The toothed component according to claim 1, wherein the action curve comprises a double point at the pitch point.

7. The toothed component according to claim 6, wherein at the double point, the action curve intersects said normal common to the pitch lines at two angles which are different from 90°.

8. The toothed component according to claim 1, wherein the action curve is at least one part of a lemniscate having a double point and two lobes that intersect, on either side of the double point, said normal common to the pitch lines.

9. The toothed component according to claim 8, wherein the lobes are symmetrical relative to said normal common to the pitch lines and relative to the tangent common to the pitch lines.

10. The toothed component according to claim 8, wherein one of the lobes is wider than an other of the lobes.

11. The toothed component according to claim 10, wherein said normal common to the pitch lines divides an area bordered by each lobe into two unequal part-areas.

12. The toothed component according to claim 8, wherein said normal common to the pitch lines divides the area bordered by each lobe into two unequal part-areas.

13. The toothed component according to claim 1, wherein the action curve is a closed curve which is entirely made of said contact points.

14. The toothed component according to claim 1, wherein each value of the function $\psi(t)$ occurs for at least three different points (t).

15. A gearset comprising inter-meshed toothed components, each according to claim 1, having action curves that coincide.

16. A gearset comprising two inter-meshed toothed components each according to claim 1, wherein establishment of contact between two teeth takes place at one said apex of the action curve, by an osculation of the two profiles, followed by a splitting of the osculating contact into two simple contacts.

* * * * *